(12) United States Patent  (10) Patent No.: US 7,536,028 B2
Sumitomo  (45) Date of Patent: May 19, 2009

(54) MONITORING CAMERA SYSTEM, MONITORING CAMERA CONTROL DEVICE AND MONITORING PROGRAM RECORDED IN RECORDING MEDIUM

(75) Inventor: Hironori Sumitomo, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 798 days.

(21) Appl. No.: 10/395,410

(22) Filed: Mar. 24, 2003

(65) Prior Publication Data

US 2003/0185419 A1    Oct. 2, 2003

(30) Foreign Application Priority Data

Mar. 27, 2002   (JP) ............................. 2002-087417

(51) Int. Cl.
- G06K 9/00 (2006.01)
- H04N 7/14 (2006.01)
- H04N 13/02 (2006.01)
- H04N 7/18 (2006.01)

(52) U.S. Cl. .................. 382/103; 382/115; 382/153; 382/154; 348/14.08; 348/47; 348/135; 348/143; 348/152

(58) Field of Classification Search ......... 382/103–105, 382/115–118, 153–154; 348/14.08–14.1, 348/47–48, 135–139, 143, 152–155, 159
See application file for complete search history.

(56) References Cited

U.S. PATENT DOCUMENTS 5,835,641 A * 11/1998 Sotoda et al. ............... 382/291
6,359,647 B1 * 3/2002 Sengupta et al. ............ 348/154

(Continued)

FOREIGN PATENT DOCUMENTS

JP    06-217316 A    8/1994

(Continued)

OTHER PUBLICATIONS

Kelly, Patrick H., Arun Katkere, Don Y. Kuramura, Saied Moezzi, Shankar Chatterjee, and Ramesh Jain. "An Architecture for Multiple Perspective Interactive Video". ACM Multimedia 95—Electronic Proceedings. Nov. 5-9, 1995. pp. 1-18.*

(Continued)

*Primary Examiner*—Matthew C Bella
*Assistant Examiner*—Manav Seth
(74) *Attorney, Agent, or Firm*—Sidley Austin LLP

(57) ABSTRACT

A monitoring system according to the present invention has a plurality of cameras respectively monitoring a monitor area and having a changeable imaging magnification, monitoring section detecting an object to be monitored in the monitor area, and control section selecting at least one camera capable of obtaining an enlarged image to contribute to identification of the object to be monitored as camera for enlargement from the plural cameras when the object to be monitored is detected and selecting at least one camera other than the camera for enlargement as camera for wide area from the plural monitoring camera. The camera for wide area is set to a first imaging magnification to obtain a wide area image of the monitor area and the camera for enlargement is set to a second imaging magnification larger than the first imaging magnification to obtain an enlarged image of the detected object to be monitored.

16 Claims, 8 Drawing Sheets

U.S. PATENT DOCUMENTS

| | | | |
|---|---|---|---|
| 6,385,772 B1* | 5/2002 | Courtney | 725/105 |
| 6,724,421 B1* | 4/2004 | Glatt | 348/154 |
| 7,057,636 B1* | 6/2006 | Cohen-Solal et al. | 348/14.08 |
| 2002/0071033 A1* | 6/2002 | Gutta et al. | 348/143 |
| 2002/0090217 A1* | 7/2002 | Limor et al. | 396/429 |

FOREIGN PATENT DOCUMENTS

| | | | |
|---|---|---|---|
| KR | 2002015505 A | * | 2/2002 |

OTHER PUBLICATIONS

Doubek, Petr, Tomas Svoboda, Katja Nummiaro, Esther Koller-Meier, and Luc Van Gool. "Face Tracking in a Multi-Camera Environment". Computer Vision Lab: Nov. 2003. pp. 1-8.*

Collins, Robert T., Alan J. Lipton, Hironobu Fujiyoshi, and Takeo Kanade. "Algorithm for Cooperative Multisensor Surveillance". Proceedings of the IEEE. vol. 89. No. 10. Oct. 2001. pp. 1456-1477.*

Stillman, Scott, Rawesak Tanawongsuwan, and Irfan Essa. "A System for Tracking and Recognizing Multiple People with Multiple Cameras". Georgia Institute of Technology, Visualization Center, Technical Report # GIT-GVU-98-25. Aug. 1998. pp. 1-6.*

Matthew Turk and Alex Pentland, "Eigenfaces for Recognition", *Journal of Cognitive Neuroscience*, vol. 3, No. 1 (1991 © Massachusetts Institute of Technology), pp. 71-86.

Henry A. Rowley, Shumeet Baluja, and Takeo Kanade, "Neural Network-Based Face Detection", *IEEE Transactions on Pattern Analysis and Machine Intelligence,* vol. 20, No. 1, Jan. 1998, pp. 23-38.

* cited by examiner

MONITORING CAMERA SYSTEM, MONITORING CAMERA CONTROL DEVICE AND MONITORING PROGRAM RECORDED IN RECORDING MEDIUM

CROSS-REFERENCE TO RELATED APPLICATION

This application is based on Japanese Patent Application No. JP 2002-87417 filed in Japan on Mar. 27, 2002, the entire content of which is hereby incorporated by reference.

BACKGROUND OF THE INVENTION

1. Field of the Invention

The present invention relates to a monitoring camera system, for monitoring a monitor area, having a plurality of monitoring cameras.

2. Description of the Related Art

There suggests a conventional monitoring camera system which has a plurality of monitoring cameras and monitors a monitor area. For example, there suggests a technique in which one of two monitoring cameras is used for wide area imaging for capturing an image of a monitor area widely, and the other camera is used for zoom-in for zooming in and capturing a moving object (intruder or the like) intruding into the monitor area so that the intruder or the like is monitored. As a result, the enlarged image of the intruder can be obtained, and thus it is convenient for identifying intruders.

However, in the above monitoring system, since the two monitoring cameras are set for the wide area imaging and the zoom in, respectively, information useful for identifying the intruder using the monitoring camera for zoom in, i.e., enlarged images of a face or the like cannot be occasionally obtained. For example, there is a case that an image of a background of an intruder is captured by the monitoring camera for zoom in.

In such a case, the plural monitoring cameras installed in different places occasionally include a monitoring camera which is suitable for capturing an image of the face of an intruder. Namely, when the plural monitoring cameras are cooperatively controlled suitably, it is considered that an image, in which abnormal contents such as intrusion can be easily recognized, can be obtained.

SUMMARY OF THE INVENTION

It is an object of the present invention to provide a technique of a monitoring camera system which is capable of obtaining an image in which an object to be monitored or an abnormal status can be easily recognized in a plurality of monitoring cameras.

The object of the present invention is achieved by providing a monitoring system comprising a plurality of cameras each of which monitors a monitor area and has a changeable imaging magnification, monitoring section which detects an object to be monitored in the monitor area, and control section which selects at least one camera capable of obtaining an enlarged image to contribute to identification of the object to be monitored as camera for enlargement from the plural cameras when the object to be monitored is detected and selects at least one camera other than the camera for enlargement as camera for wide area from the plural monitoring camera, said control section setting the camera for wide area to a first imaging magnification to obtain a wide area image of the monitor area, and setting the camera for enlargement to a second imaging magnification larger than the first imaging magnification to obtain an enlarged image of the detected object to be monitored.

BRIEF DESCRIPTION OF DRAWINGS

These and other objects, advantages and features of the invention will become apparent from the following description thereof taken in conjunction with the accompanying drawings in which.

DETAILED DESCRIPTION OF THE PREFERRED EMBODIMENTS

There will be explained below embodiments of the monitoring camera system according to the present invention with reference to the attached drawings.

<First Embodiment>

<Main Section Structure of Monitoring Camera System>

Figure 1:
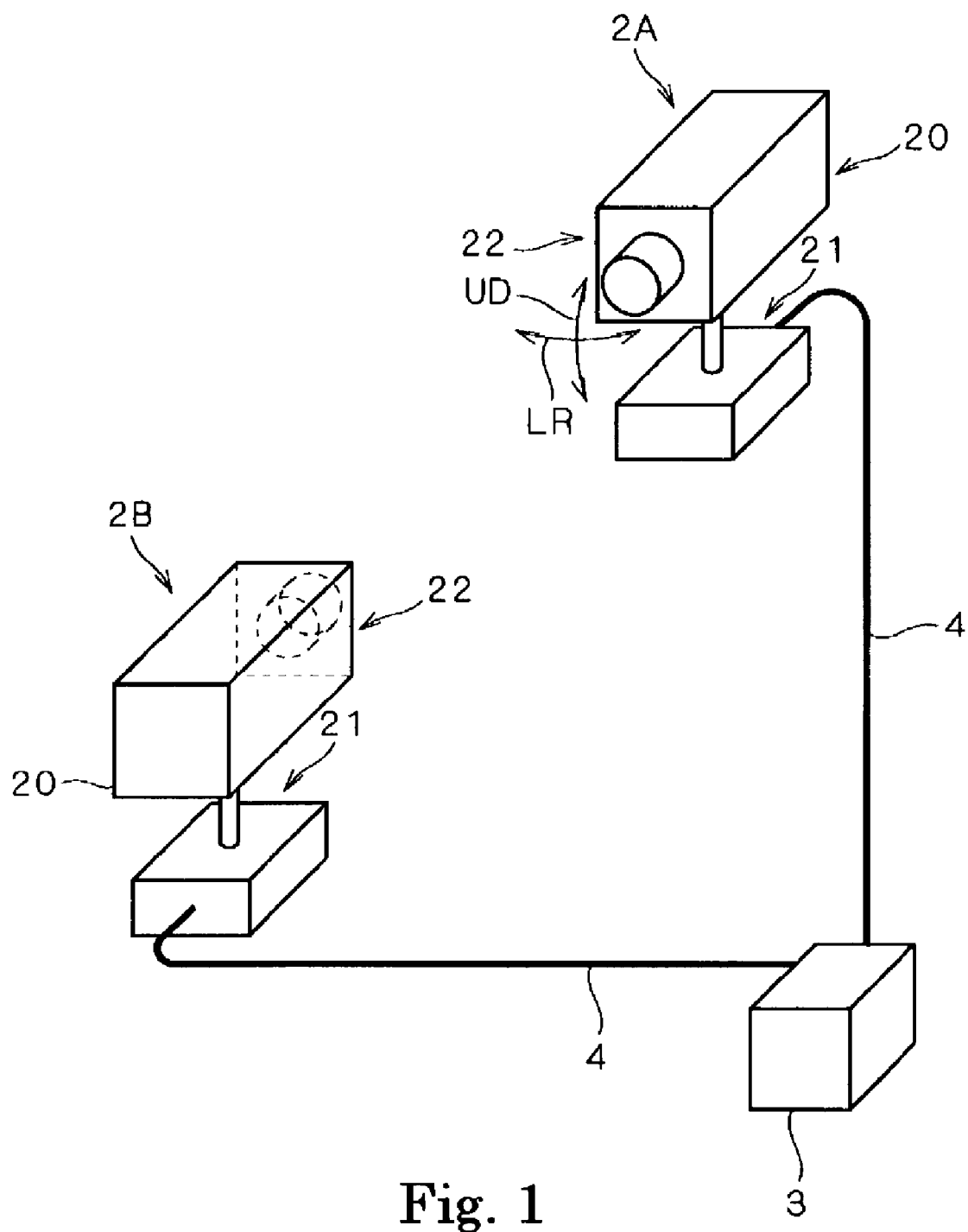
FIG. 1 is a schematic diagram showing a main section structure of a monitoring camera system 1 according to a first embodiment of the present invention.

FIG. 1 is a schematic diagram showing a main section structure of a monitoring camera system 1 according to the first embodiment of the present invention.

The monitoring camera system 1 has two monitoring cameras 2 (2A, 2B) installed for monitoring a monitor area RM (mentioned later), a control box 3 for controlling the cameras, and a cable 4 for connecting the monitoring cameras 2 with the control box 3 in a communicable state.

The monitoring cameras 2 have an approximately box shaped camera section 20, and a direction changing section 21 which can change a imaging direction of the camera section 20. A protrusion of the camera section 20 is provided with a lens section 22 composed of a plurality of lenses.

The direction changing section 21 has a tilt mechanism for changing the imaging direction of the camera section 20 to an up-down direction UD and a left-right direction LR.

The control box 3 has a box type outer shape and functions as a monitoring camera control device. The control box 3 is provided with a connecting terminal (not shown) for transmitting an image to an external monitor or the like.

Figure 2:
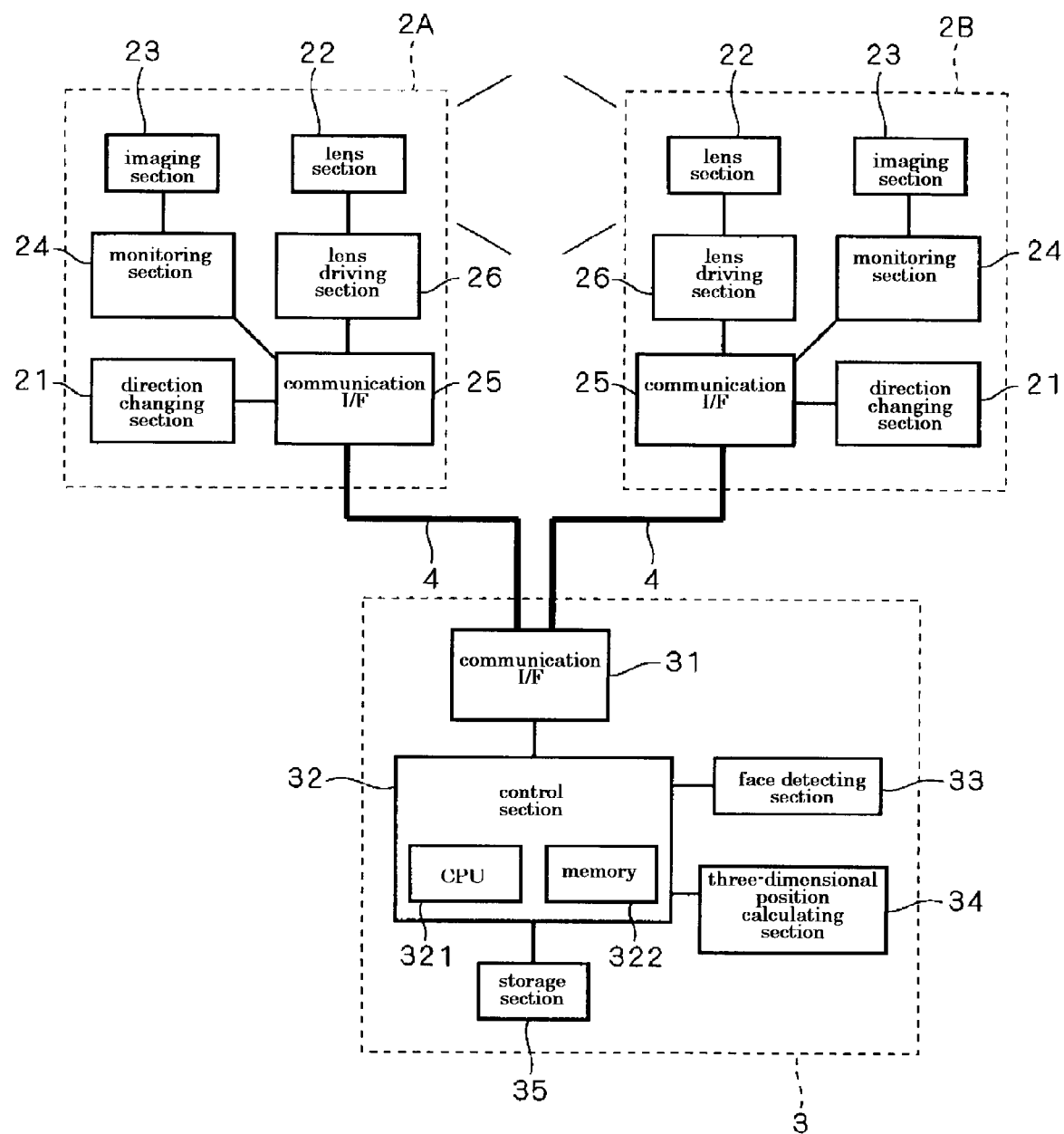
FIG. 2 is a block diagram showing a functional structure of the monitoring camera system 1.

FIG. 2 is a block diagram showing a functional structure of the monitoring camera system 1.

The monitoring cameras 2 have an imaging section 23 for imaging an object via the lens section 22, and a variable monitoring section 24 which is connected with the imaging section 23 transmissively. Moreover, the monitoring cameras 2 have a communication I/F 25 which is connected with the direction changing section 21 transmissively and a lens driving section 26 which is connected with the communication I/F 25 transmissively.

The imaging section 23 has a solid-state image sensing device composed of, for example, CCD, and obtains image data of an object image imaged by the lens section 22.

The monitoring section 24 analyzes the image captured by the imaging section 23 so as to detect an intruder who intrudes into a monitor area. The intruder is detected by utilizing a method of evaluating a differential image of two images continuous with respect to, for example, the time base (time differential method).

The communication I/F 25 is an interface for transmitting data with the control box 3 via the cable 4. The data to be transmitted from the monitoring cameras 2 to the control box 3 are captured image data and a differential image generated in the monitoring section 24, and the data to be transmitted from the control box 3 to the monitoring cameras 2 are commands which instruct the imaging directions and commands which instruct imaging magnification.

The lens driving section 26 changes the arrangement of the lenses composing the lens section 22 so as to change imaging magnification such as zoom-in and zoom-out and bring an object into focus.

The control box 3 has a communication I/F 31 for transmitting data with the monitoring cameras 2 via the cable 4, and a control section 32 which is connected with the communication I/F 31 transmissively. Moreover, the control box 3 has a face detecting section 33 which is connected with the control section 32 transmissively, and a three-dimensional position calculating section 34 and a storage section 35.

The face detecting section 33 cuts out an area of the differential image from the captured image based on the differential image obtained in the variable monitoring section 24 of the monitoring camera 2 and transmitted therefrom, so as to detect the face of the intruder from the area. Namely, image data of only the image portion where a movement of the intruder or the like is detected are utilized so as to search the face. As a result, the face area can be detected quickly.

The face is detected by utilizing a method using, for example, an eigenface space (described in document "Matthew Turk and Alex Pentland; Eigenfaces for Recognition; Journal of Cognitive Neuroscience, Vol. 3, No. 1, pp.71-86 (1991)".

The three-dimensional position calculating section 34 calculates a three-dimensional position of an intruder in the monitor area RM based on two images transmitted from the two monitoring cameras 2A and 2B, for example, by applying the principle of triangulation. As a result, when the face of the intruder is zoomed in, distances from the monitoring cameras 2 to the intruder can be extracted so that a lens driving amount for capturing an image of the face of the intruder with a suitable size can be calculated.

The storage section 35 records image data obtained in the imaging sections 23 of the monitoring cameras 2.

The control section 32 has a CPU 321 which serves as a computer and a memory 322, and it controls the operation of the monitoring camera system 1 in a supervisory manner.

<Operation of Monitoring Camera System 1>

Figure 3:
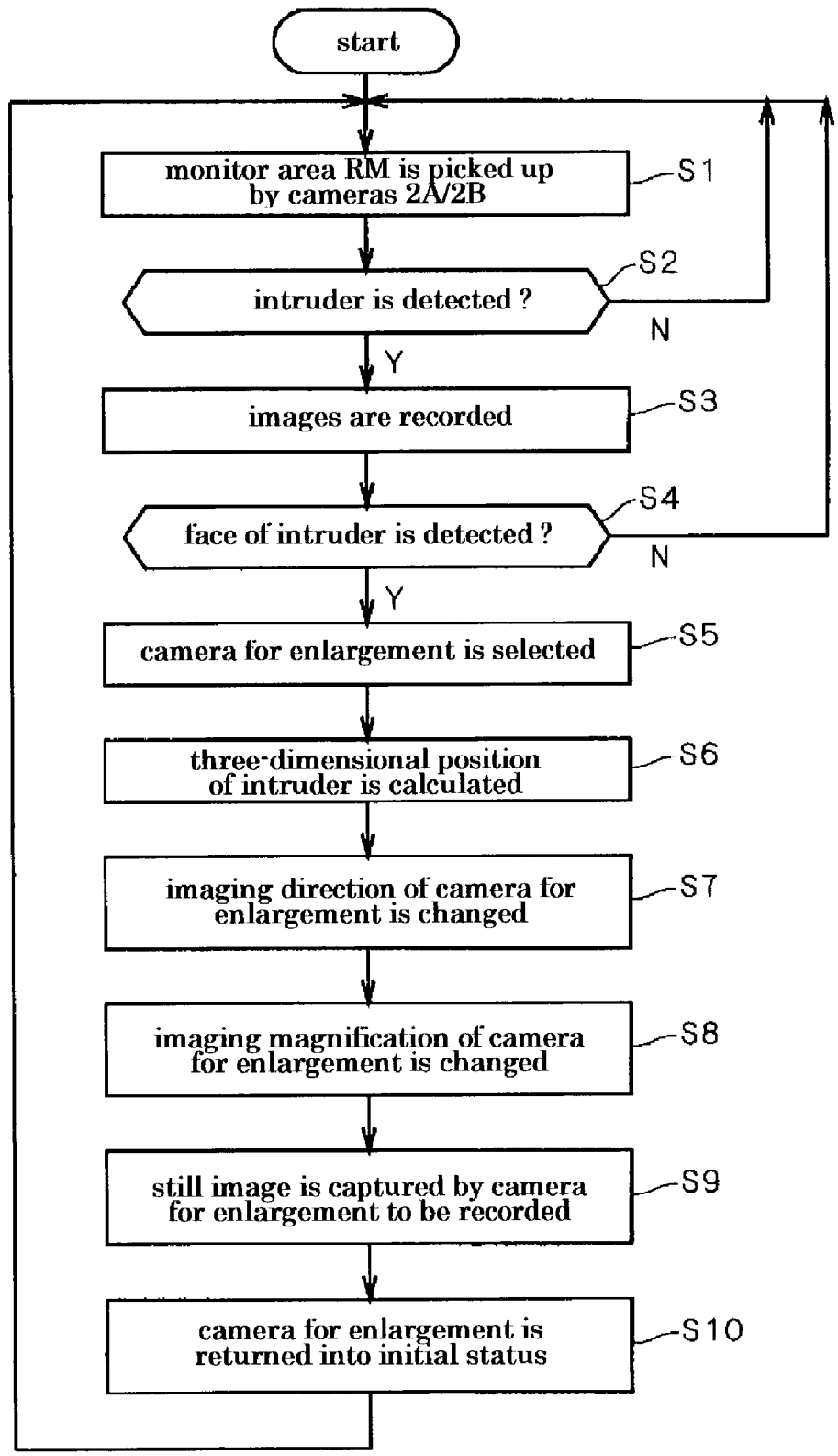
FIG. 3 is a flowchart explaining an operation of the monitoring camera system 1.

FIG. 3 is a flowchart explaining the operation of the monitoring camera system 1. Moreover, FIGS. 4(a) through 4(d) are diagrams respectively explaining the operation of the monitoring camera system 1. FIGS. 4(a) through 4(d) show the drawings in which the monitor area RM corresponding to a room is viewed from above, and the arrows DF in the drawings show directions of the face of a intruder (person) MN.

There will be explained below the concrete operation of the monitoring camera system 1 in the case where the one intruder MN intrudes into the monitor area RM. This operation is performed by the control section 32. The control box 3 is provided with a media drive (not shown) that reads out information recorded in a portable recording medium such as a CD-ROM, DVD (Digital Versatile Disk), flexible disk or memory card. The control box 3 reads a software program (hereinafter, simply referred to as a "program") recorded on the recording medium and, by executing the program by using CPU, functions as a controller in the monitoring camera system 1. The program may be supplied (or distributed) to the control box 3 via a network such as the Internet.

Figure 4:
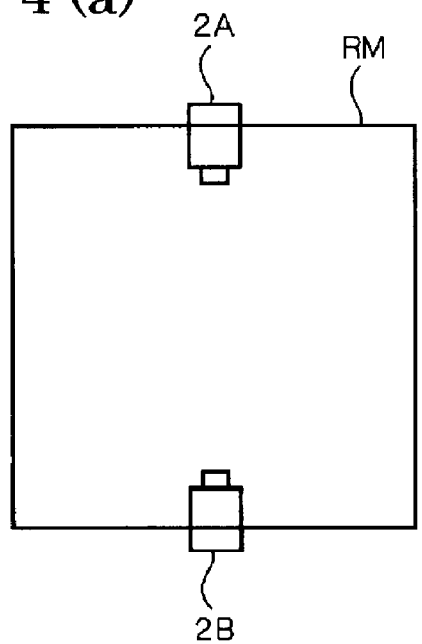
FIGS. 4(a) through 4(d) are diagrams respectively explaining the operation of the monitoring camera system 1.
Figure 4:
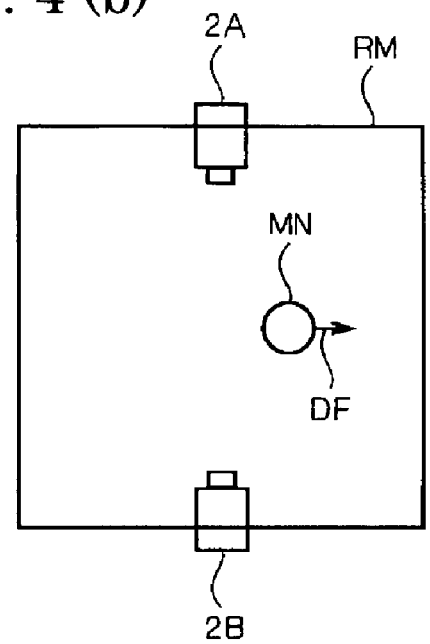
Figure 4:
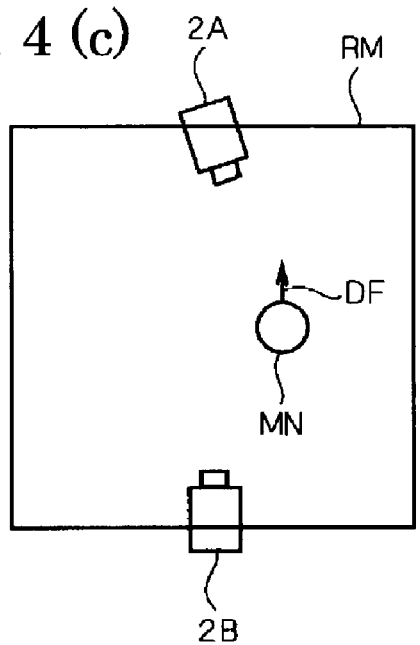
Figure 4:
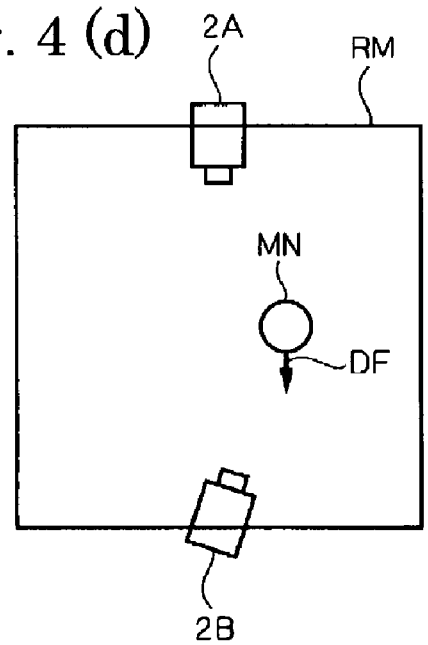

The two monitoring cameras 2A, 2B capture an image of the monitor area RM at step S1. As shown in FIG. 4(a), the imaging directions of cameras 2A and 2B are turned to the center portion of the monitoring area RM, and the imaging magnification is decreased so that wide-angle imaging is carried out.

A judgment is made at step S2 as to whether the monitoring sections 24 of the monitoring cameras 2A, 2B detect an intruder (abnormality). For example, existence of an image portion temporally moving in the visual fields of the monitoring cameras 2A, 2B is detected by the above-mentioned time differential method so that existence of the intruder can be grasped. As shown in FIG. 4(b), when the intruder is detected, the process goes to step S3, and when not detected, the process returns to step S1.

Images captured by the monitoring cameras 2A, 2B are recorded at step S3. Concretely, the image data obtained in the imaging sections 23 are recorded in the storage section 35.

A judgment is made at step S4 as to whether the face detecting section 33 of the control box 3 detects the face of the intruder MN. There will be explained below the process at step S4 by giving a concrete example.

In the state shown in FIG. 4(b), since the face of the intruder MN does not face the monitoring cameras 2, the two monitoring cameras 2A, 2B cannot detect the face of the intruder MN.

Figure 5:
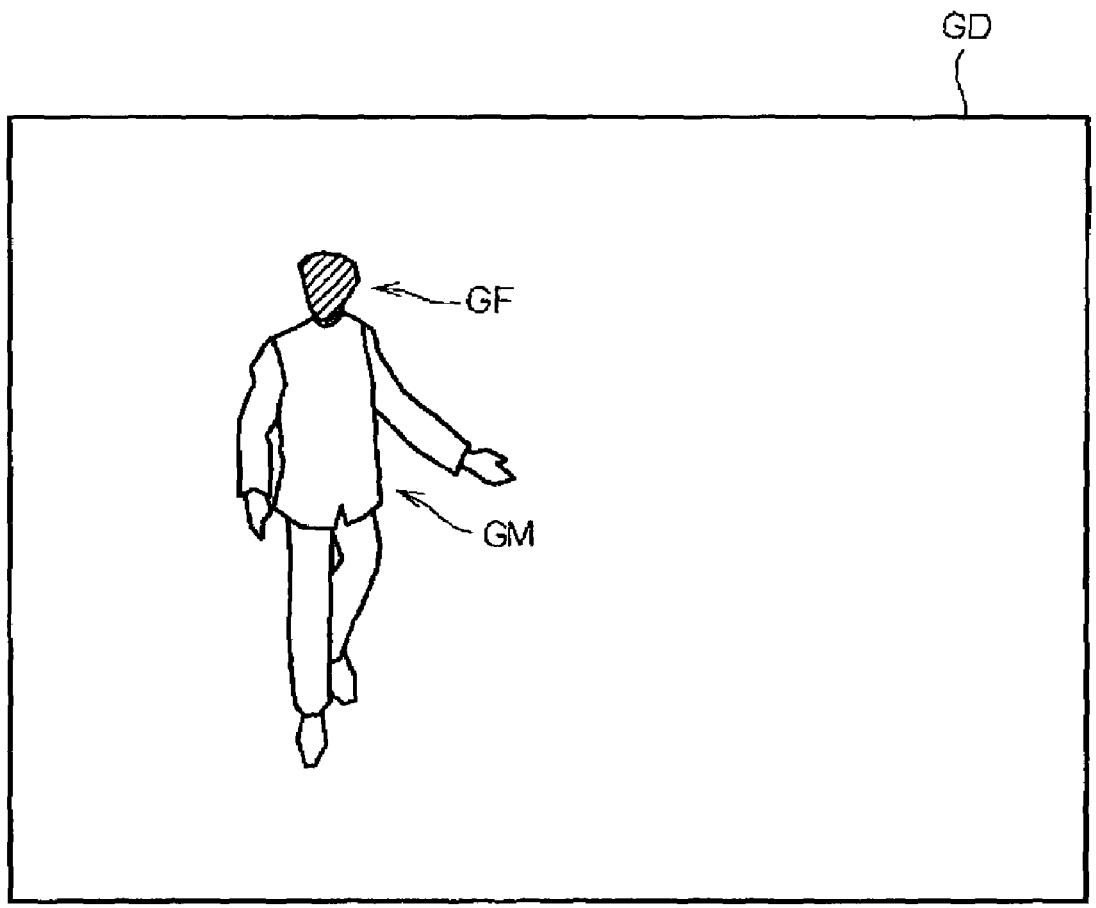
FIG. 5 is a diagram for explaining detection of a face area GF of an intruder MN.

Meanwhile, in the state shown in FIG. 4(c), in the case where the direction DF of the face of the intruder MN is turned to the monitoring camera 2A, an image GD shown in FIG. 5 is captured by the monitoring camera 2A. The face detecting section 33 detects a face area GF (portion shown by parallel slanted lines) based on a differential image GM (an image portion of the intruder MN) extracted by the monitoring section 24.

When the face is detected at step S4, the process goes to step S5. At this time, face finding information indicating which monitoring camera 2 has detected the face is transmitted from the face detecting section 33 to the control section 32. Moreover, when the face is not detected, the process returns to step S1.

A monitoring camera for enlargement which is suitable for capturing an image of the face area GF of the intruder MN shown in FIG. 5 is selected from the two monitoring cameras 2A, 2B at step S5. Concretely the monitoring camera 2 which has detected the face at step S4 is selected. At this time, since the monitoring camera which has not been selected as the monitoring camera for enlargement is not suitable for capturing an image of the face area GF, such a camera is selected as a monitoring camera for wide area.

At step S6, the three-dimensional position calculating section 34 calculates the three-dimensional position of the intruder MN in the monitor area RM, namely, the distance from the monitoring camera for enlargement selected at step S5 to the intruder.

The imaging direction of the monitoring camera 2A selected for enlargement is changed to face the intruder MN at step S7. In the case of FIG. 4(c), the imaging direction of the monitoring camera 2A is changed to face the intruder MN corresponding to an abnormality occurring place.

The imaging magnification of the monitoring camera 2 selected for enlargement is changed at step S8. Concretely, the lens driving section 26 is brought into active, and the lens arrangement of the lens section 22 is adjusted so that the face area GF shown in FIG. 5 is enlarged within the image captured by the camera. As a result, the imaging magnification set in the monitoring camera 2 for enlargement (second imaging magnification) become larger than the imaging magnification set in the monitoring camera 2 for wide area (first imaging magnification).

One still image (enlarged image) including the face area GF of the intruder MN zoomed in by the monitoring camera 2 selected for enlargement is obtained and recorded in the storage section 35 at step S9. The face area GF of the intruder MN is enlarged into a suitable size within the image by the process at steps S7 and S8, and useful information which contributes to identification of the intruder can be obtained. Moreover one still image is recorded so that excessive image capturing is prevented, thereby making a recording size small.

Meanwhile, since the monitoring camera 2 selected for wide area, for example, the monitoring camera 2B shown in FIG. 4(c) captures an image in an initial state, the camera 2B can capture an image of the entire monitor area RM securely and can record a wide area image.

In the case where the intruder MN turns his/her face direction DF through 180° (transition from the state of FIG. 4(c) to the state of FIG. 4(d)) during the process at steps S7 and S8, the face finding information output from the face detecting section 33 is updated, and that the monitoring camera 2B has found the face is transmitted to the control section 32. At this time, it is preferable that the process for switching between the monitoring camera for wide area and the monitoring camera for enlargement is executed. Namely, as shown in FIG. 4(d), the face of the intruder MN is zoomed in by the monitoring camera 2B so that the still image is obtained, and the process for changing the imaging direction and the imaging magnification of the monitoring camera 2A is stopped, so that the monitoring camera 2A is returned into the initial state (process at step S10, mentioned later). Such a process can prevent a wasteful still image which does not include the face area from being captured, and returns the monitoring camera which cannot capture an image of the face into the initial state quickly so that actions of the intruder can be monitored suitably.

The monitoring camera 2 selected for enlargement is returned into the initial state at step S10. Namely, although the imaging direction and the imaging magnification of the monitoring camera 2 for enlargement are changed by the process at steps S7 and S8, this monitoring camera 2 is returned into the initial imaging posture shown in FIG. 4(a), and the monitor area RM is zoom out, namely, the imaging magnification is decreased so that the monitor area RM can be captured with wide angle.

According to the above operation of the monitoring camera system 1, the monitoring camera which has detected the face of the intruder is selected as the monitoring camera for enlargement so as to obtain the enlarged image of the face and the other monitoring camera for wide area captures the entire monitor area. Consequently, the image in which the abnormal contents including identification and action of the intruder can be recognized easily, can be obtained.

Figure 6A:
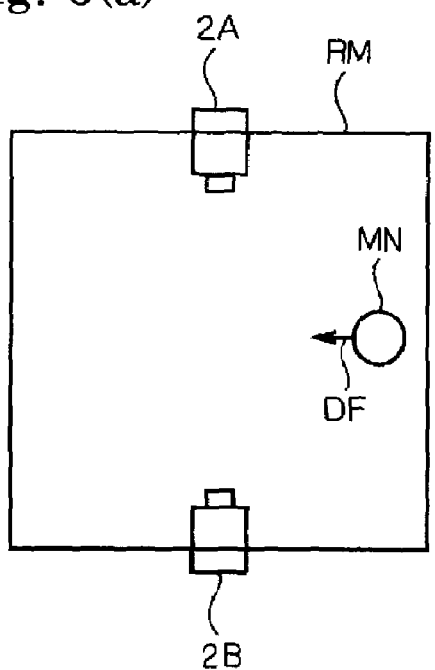
FIGS. 6(a) and 6(b) are diagrams respectively explaining the operation of the monitoring camera system 1.

In the operation of the monitoring camera system 1 shown in the flowchart of FIG. 3, as shown in FIG. 6(a), in the case where the monitoring cameras 2A, 2B detect the face of the intruder MN in the similar manner, for example, the monitoring camera 2A is selected as the monitoring camera for enlargement in preference to the monitoring camera 2B.

In this case, face likeness of the intruder is judged. In the case where the eigenface space is used for the judgment of the face likeness, the distances from the detected faces to the eigenface space are compared with each other. The face which has a smaller value of the distance (with higher similarity with respect to the eigen face) is judged as more face likeness. Since the value of the distance is calculated when the face is detected, that value can be diverted.

Figure 6B:
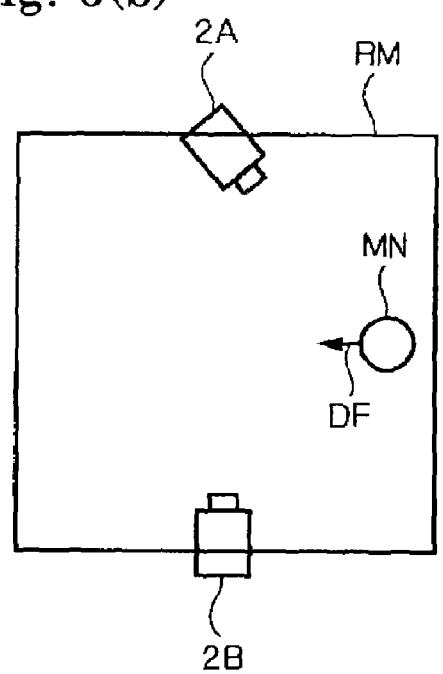

As a result, as shown in FIG. 6(b) the enlarged image can be obtained by only the one monitoring camera 2A, and the wide area image of the monitor area RM can be obtained by the other monitoring camera 2B. In this case, the image, in which the abnormality contents including identification and action of the intruder can be recognize easily, can be obtained.

<Second Embodiment>

A monitoring camera system 5 according to the second embodiment of the present invention has the similar structure to that of the monitoring camera system 1 according t the first embodiment except for the control section 32.

Namely, a program which performs the operation of the monitoring camera system 5, explained below, is incorporated into the control section 32 of the monitoring camera system 5.

Figure 7:
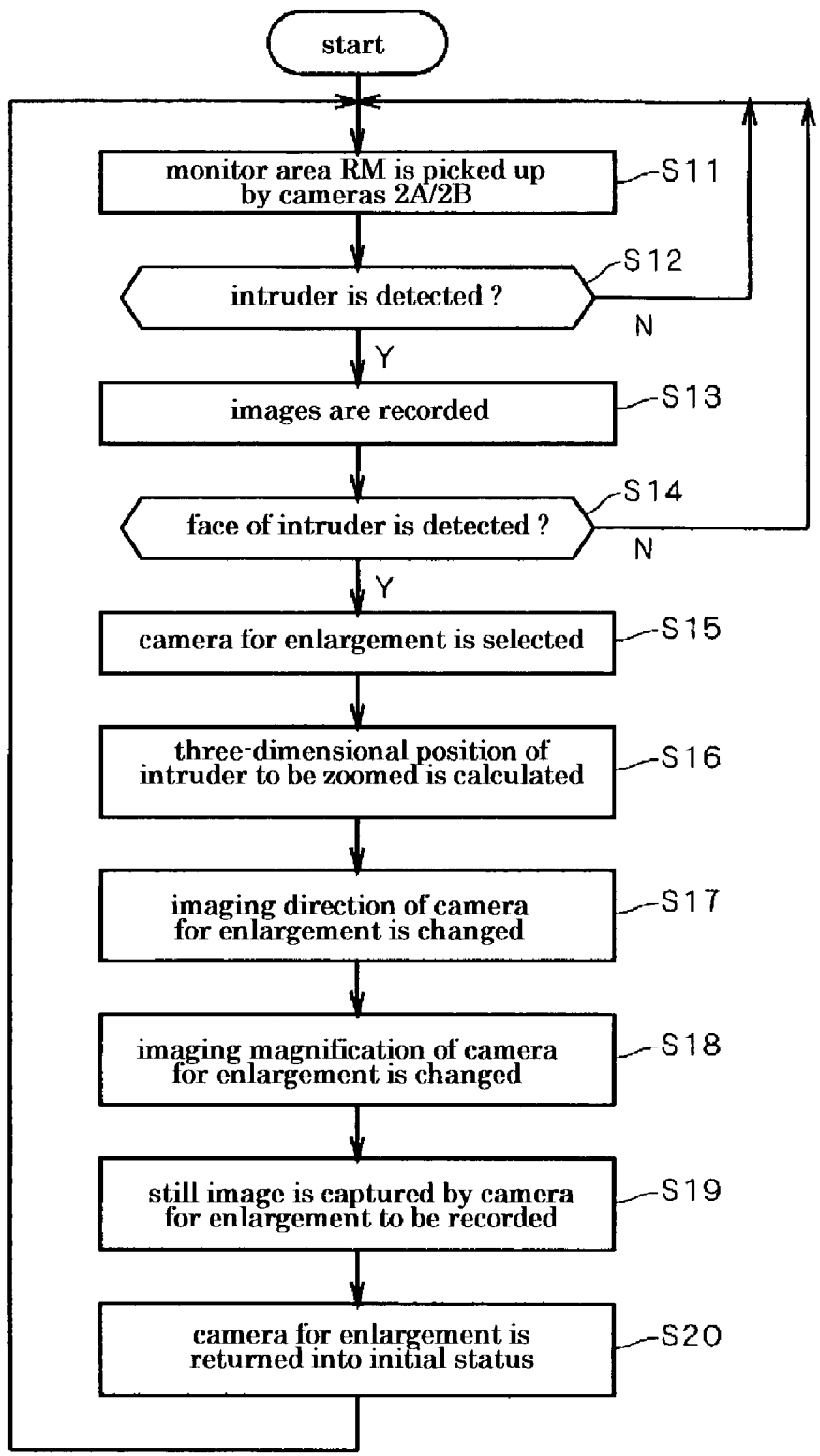
FIG. 7 is a flowchart explaining an operation of a monitoring camera system 5 according to a second embodiment of the present invention.

FIG. 7 is a flowchart explaining the operation of the monitoring camera system 5. Moreover, FIGS. 8(a) through 8(d) are diagrams respectively explaining the operation of the monitoring camera system 5. FIGS. 8(a) through 8(d) respectively show diagram in which the monitor area RM corresponding to a room is viewed from above, and the arrows DF in the diagrams show directions of the faces of intruders M1, M2.

There will be explained below the concrete operation of the monitoring camera system 5 in the case where the two intruders M1, M2 intrude into the monitor area RM. This operation is performed by the control section 32. The operation of the control section 32 is describe in the program, and is performed by reading the program via a computer.

At steps S11 through S13 the similar process to steps S1 through S3 show in the flowchart of FIG. 3 is executed.

A judgment is made at step S14 as to whether the face detecting section 33 of the control box 3 detects the faces of the intruders M1, M2. There will be explained below the process at step S14 by giving a concrete example.

Figure 8A:
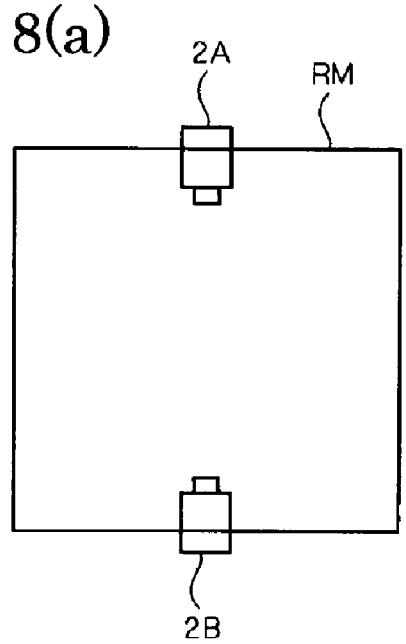
FIGS. 8(a) through 8(d) are diagrams respectively explaining the operation of the monitoring camera system 5.
Figure 8B:
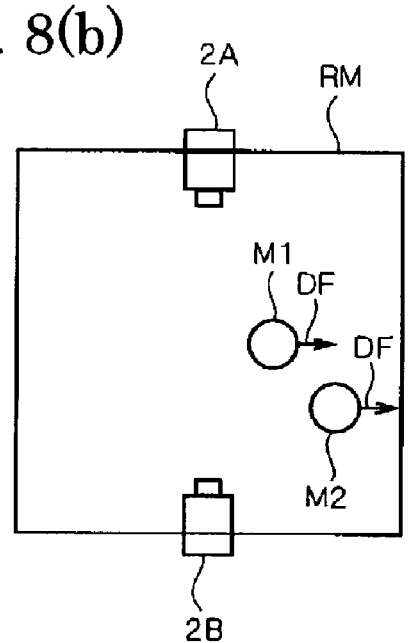

For example as shown in FIG. 8(b), since the directions DF of the faces of the intruders M1, M2 do not face the monitoring cameras 2, the two monitoring cameras 2A, 2B cannot detect the faces of the intruders M1, M2.

Meanwhile, in the state of FIG. 8(b) in the case where the intruder M1 turns his/her face to the monitoring camera 2A, similarly to the first embodiment, the face detecting section 33 detects the face area based on a differential image extracted by the monitoring section 24 (image portion of the intruder MN). The judgment is made as to whether this face area is detected.

When the face is detected at step S14, the process goes to step S15. At this time, face finding information indicating which monitoring camera has detected the face is transmitted from the face detecting section 33 to the control section 32. Moreover, when the face is not detected, the process returns to step S11.

Figure 8C:
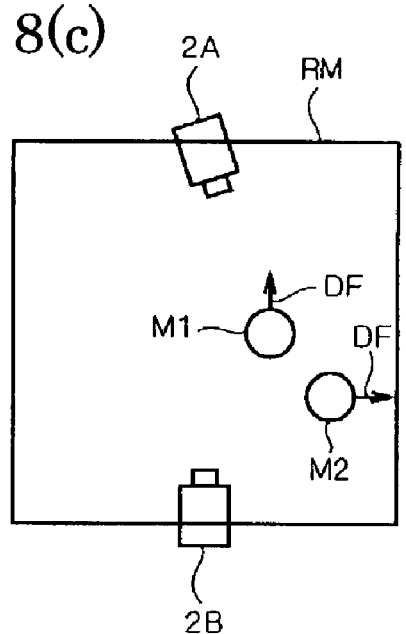

The monitoring camera for enlargement which is suitable for imaging the face area GF of the intruder is selected from the two monitoring cameras 2A, 2B at step S15. As shown in FIG. 8(c), in the case where the intruder M1 turns the direction DF of the face to the monitoring camera 2A, the monitoring camera 2A is selected as the monitoring camera for enlargement, and the monitoring camera 2B is selected as the monitoring camera for wide area.

At step S16, the three-dimensional position calculating section 34 calculates the three-dimensional position of the intruder in the monitor area RM to be zoomed in, namely, the distance from the monitoring camera 2 for enlargement selected at step S15 to the intruder.

At step S17, the imaging direction of the monitoring camera 2 selected for enlargement is changed to face the intruder corresponding to the abnormality occurring place. Namely, in the case of FIG. 8(c), the imaging direction of the monitoring camera 2A is turned to the intruder M1.

At step S18, the imaging magnification of the monitoring camera 2A selected for enlargement is changed. Concretely, the lens driving section 26 is brought into active, and the lens arrangement of the lens section 22 is adjusted so that the face area GF is enlarged within the captured image. As a result, the imaging magnification set in the monitoring camera 2 for enlargement (second imaging magnification) becomes larger than the imaging magnification (first imaging magnification) set in the monitoring camera 2 for wide area.

One still image (enlarged image) including the face of the intruder zoomed in by the monitoring camera 2 selected for enlargement is captured and is recorded in the storage section 35 at step S19. Namely, in the case of FIG. 8(c), the monitoring camera 2A records the still image of the face of the intruder M1.

Meanwhile, since the monitoring camera 2 for wide area, for example, the monitoring camera 2B in FIG. 8 (c) captures an object in the initial state, the monitoring camera 2B captures an image of the entire monitor area RM securely so as to be capable of recording a wide area image.

As explained above, the monitoring camera 2 for enlargement zooms in the one intruder whose face has been detected in the plural intruders M1, M2, thereby avoiding the situation where the two monitoring cameras 2 zoom in the intruders simultaneously and thus cannot capture an image of the entire monitor area.

In the case where the monitoring camera 2 set for wide area detects the face of the intruder and this intruder is identical to the intruder to be zoomed in by the monitoring camera 2 for enlargement during the process at steps S17 and S18, it is preferable that the monitoring camera is switched between enlargement and wide area. Namely, the monitoring camera 2 which has detected the face newly is switched into the monitoring camera 2 for enlargement and so as to zooms in the face area of the intruder and obtain the still image, and the monitoring camera 2 set for enlargement is switched into the monitoring camera 2 for wide area so that the process for changing the imaging direction and the imaging magnification is stopped and the process for returning the monitoring camera to the initial state (the process at step S20, mentioned later) is executed. As for the judgment of the identical person, for example, the judgment is made as to whether the three-dimensional position of the intruder having the detected face is changed, and when it is not changed, the process for regarding this intruder as the identical person is executed. Such a process can prevent imaging of a useless still image which does not include the face area and returns the monitoring camera 2 which cannot capture an image of the face into the initial state quickly so that the action of the intruder can be monitored suitably.

Figure 8D:
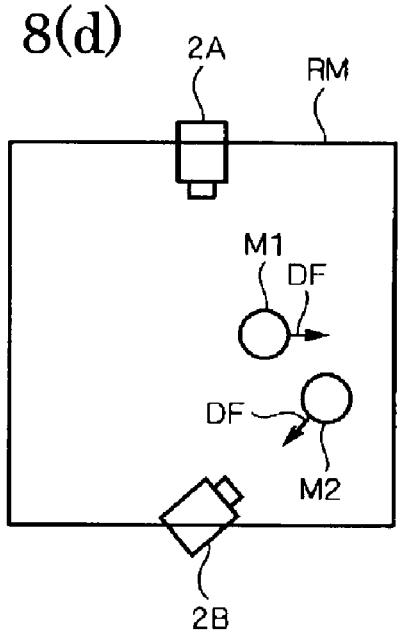
Figure 2:
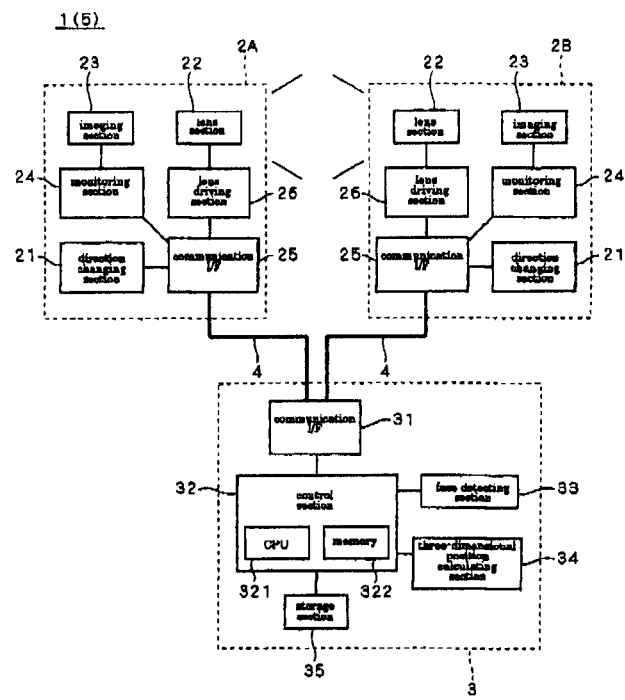

In addition, in the case where the monitoring camera 2 set for wide area detects the face of the intruder and this intruder is different from the intruder to be zoomed in by the monitoring camera 2 for enlargement, for example as shown in FIG. 8(c), after the monitoring camera 2A records the enlarged image of the face of the intruder M1, the monitoring cameras 2 are switched between enlargement and wide area, so that the monitoring camera 2B records the enlarged image of the intruder M2 as shown in FIG. 8(d). Such a process enables the enlarged images of the plural intruders M1, M2 to be obtained. At this time, the other monitoring camera for wide area executes zoom imaging and wide angle imaging.

At step S20 the same process as the process at step S10 shown in the flow chart of FIG. 3 is executed.

The above operation of the monitoring camera system 5 can obtain the image in which abnormality contents can be recognized easily similarly to the first embodiment. Further, in the case where a plurality of intruders are detected in the monitor area, still images of respective face areas are captured, respectively, thereby preventing all the monitoring cameras from zooming in one intruder.

<Modified Example>

As for the detection of abnormality in the above embodiments, it is not essential that an intruder who intrudes into the monitor area is detected based on the image captured by the monitoring camera. The intruder may be detected by an infrared sensor.

The abnormality in the above embodiments is not limited to intruders but may include fire which occurs in the monitor area.

In addition, it is not essential that the monitoring camera captures an image of the monitor area before abnormality is detected. The monitoring camera may start image capturing after the infrared sensor or the like detects abnormality.

In the above embodiments, the monitoring by the two monitoring cameras is not essential. Three or more monitoring cameras may execute the monitoring. For example in the case where four monitoring cameras execute the monitoring, the two monitoring cameras are selected for enlargement, and the other two monitoring cameras can be selected for wide area.

It is not essential that the three-dimensional position of the intruder in the above embodiments is calculated from the captured images obtained by the two monitoring cameras. It may be calculated based on an output of a range sensor which measures a distance utilizing infrared radiation or the like.

In the above embodiments, it is not essential that an intruder is zoomed in and one still image is obtained. A plurality of still images which have been preset may be captured. Moreover, it is not limited to the capturing of a still image. An intruder is zoomed in and a dynamic image may be captured.

As for the detection of an intruder in the above embodiments, it is not essential that the intruder is detected by utilizing the time differential method. The detection may utilize a method of evaluating a differential image between an image of a monitor area previously held (a first captured still image in a memory at the time of starting the monitoring) and images of the monitor area successively captured (background differential method).

The detection of the face area in the above embodiments is not limited to the method utilizing the eigen face space. The face area may be extracted by utilizing, for example, a method using a neural network (described in document "Henry A. Rowley, Shumeet Baluja and Takeo Kanade; Neural Network-Based Face Detection; IEEE Transactions on Pattern Analysis and Machine Intelligence, Vol. 20, No. 1, pp. 23-38 (1998)".

In addition, it is not essential that a face is detected based on the captured images of all monitoring cameras. The face may be detected based on the captured image of at least one monitoring camera. For example in the case where an occipital region of an intruder can be detected, since it can be estimated that the intruder's face is on the opposite side to the occipital region, it is not always necessary that the image capturing is executed by all the monitoring cameras.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

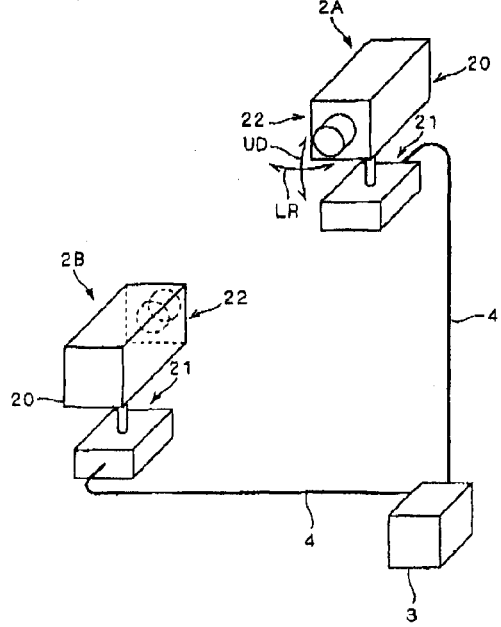

What is claimed is:

1. A monitoring system comprising:
   a plurality of cameras each of which monitors a monitor area and has a changeable imaging magnification;
   monitoring section which detects an object to be monitored in the monitor area; and
   control section configured to control said plurality of cameras in a supervisory manner, and which, in response to the detection of the object to be monitored, selects at least one camera capable of obtaining an enlarged image to contribute to identification of the object to be monitored as camera for enlargement from the plural cameras and selects at least one camera other than the camera for enlargement as camera for wide area from the plural monitoring camera, said control section setting the camera for wide area to a first imaging magnification to obtain a wide area image of the monitor area, and setting the camera for enlargement to a second imaging magnification larger than the first imaging magnification to obtain an enlarged image of the detected object to be monitored.

2. A monitoring system as claimed in claim 1 wherein imaging direction of each camera is changeable, and said control section turns the imaging direction of the camera for enlargement to the object to be monitored.

3. A monitoring system as claimed in claim 1 wherein the object to be monitored includes a person or an abnormal status in the monitor area.

4. A monitoring system as claimed in claim 1 wherein said monitoring section detects the object to be monitored based upon an image captured by at least one of the plurality of cameras.

5. A monitoring system as claimed in claim 4 wherein said monitoring section detects a face of a person based upon an image captured by at least one of the plurality of cameras, and said control section selects the camera capable of obtaining the enlarged image to contribute to identification of the face of the person as the camera for enlargement from the plural cameras.

6. A monitoring system as claimed in claim 5 wherein said enlarged image includes an enlarged image of the face of the person.

7. A monitoring system as claimed in claim 1 wherein said monitoring section detects the object to be monitored based upon an output from a sensor disposed in the monitor area.

8. A monitoring camera control device communicably connected with a plurality of cameras for monitoring a monitor area, imaging magnification of each camera being changeable, said camera control device comprising:
   selecting section which, in response to the detection of the object to be monitored by at least one camera, selects at least one camera capable of obtaining an enlarged image to contribute to identification of an object to be monitored as the camera for enlargement from the plural cameras and selects at least one camera other than the camera for enlargement as the camera for wide area from the plural monitoring cameras; and
   control section configured to control said plurality of cameras in a supervisory manner which sets a camera for wide area to a first imaging magnification to obtain a wide area image of the monitor area and sets a camera for enlargement to a second imaging magnification larger than the first imaging magnification to obtain an enlarged image of the detected object to be monitored.

9. A camera control device as claimed in claim 8 wherein imaging direction of each camera communicably connected with the camera control device is changeable, and said control section turns the imaging direction of the camera for enlargement to the object to be monitored.

10. A camera control device as claimed in claim 8 wherein the object to be monitored includes a person or an abnormal status in the monitor area.

11. A camera control device as claimed in claim 8 wherein an operation of the control section is described in a program, and said program is read by a computer in the control section.

12. A program product embodied in a computer readable medium which controls a plurality of cameras monitoring a monitor area in a supervisory manner, said program product comprising the instructions for:
   determining whether at least one camera detects an object to be monitored in the monitor area;
   selecting, in response to the detection of the object to be monitored, at least one camera capable of obtaining an enlarged image to contribute to identification of the detected object to be monitored as camera for enlargement from the plural cameras
   selecting, in response to the detection of the object to be monitored, at least one camera other than the camera for enlargement as camera for wide area from the plural monitoring cameras;
   setting the camera for wide area to a first imaging magnification to obtain a wide area image of the monitor area; and
   setting the camera for enlargement to a second imaging magnification larger than the first imaging magnification to obtain an enlarged image of the detected object to be monitored.

13. A program product as claimed in claim 12 further comprising the instruction for:
   turning imaging directions of the camera for enlargement to the object to be monitored.

14. A program product as claimed in claim 12 wherein the object to be monitored includes a person or an abnormal status in the monitor area.

15. A monitoring system comprising:
   a plurality of cameras, each camera having a variable imaging magnification capability and being adapted to monitor a monitor area; and a control device configured to operate with said plurality of cameras, said control device including:

a monitor section which is adapted to detect an object to be monitored in the monitor area based on data received from at least one of said plurality of cameras; and a control section which is configured to control two or more of said plurality of cameras in a supervisory manner, said control section being configured so that, in response to the detection of the object being monitored, said control section selects at least one camera, from said plurality of cameras, as a camera for enlargement for obtaining an enlarged image to contribute to identification of the object to be monitored, said control section being further configured so that, in response to the detection of the object being monitored, said control section selects another one of said plurality of cameras as a camera for wide area to obtain a wide area image of the monitor area, a magnification of said camera for enlargement being larger than a magnification of said camera for wide area.

16. A monitoring system comprising:

a plurality of cameras, each camera having a variable imaging magnification capability and being adapted to monitor a monitor area; and a control device configured to operate with said plurality of cameras, said control device including:

means for detecting an object to be monitored in the monitor area; and means for controlling two or more of said plurality of cameras in a supervisory manner so that, in response to the detection of the object being monitored, at least one camera, from said plurality of cameras, is selected as a camera for enlargement for obtaining an enlarged image to contribute to identification of the object to be monitored, and so that, in response to the detection of the object being monitored, another one of said plurality of cameras is selected as a camera for wide area to obtain a wide area image of the monitor area;

wherein, a magnification of said camera for enlargement is larger than a magnification of said camera for wide area.

* * * * *

UNITED STATES PATENT AND TRADEMARK OFFICE
CERTIFICATE OF CORRECTION

PATENT NO. : 7,536,028 B2
APPLICATION NO. : 10/395410
DATED : May 19, 2009
INVENTOR(S) : Sumitomo It is certified that error appears in the above-identified patent and that said Letters Patent is hereby corrected as shown below:

The Title page, showing an illustrative figure, should be deleted and substitute therefor the attached title page.

Drawing Sheet 1, Fig. 1, please delete Fig. 1 and add new Fig. 1 below.

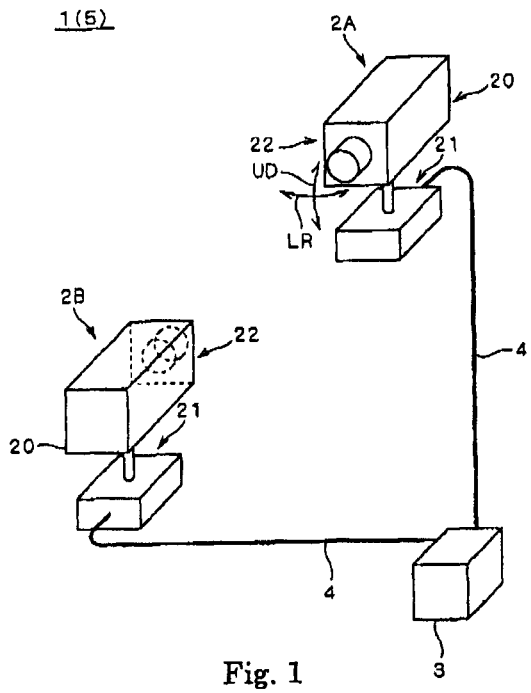

Fig. 1

Signed and Sealed this

Twenty-second Day of June, 2010

David J. Kappos
*Director of the United States Patent and Trademark Office*

Drawing Sheet 2, Fig. 2, please delete Fig. 2 and add new Fig. 2 below.

CERTIFICATE OF CORRECTION (continued)

United States Patent
Sumitomo

(10) Patent No.: US 7,536,028 B2
(45) Date of Patent: May 19, 2009

(54) MONITORING CAMERA SYSTEM, MONITORING CAMERA CONTROL DEVICE AND MONITORING PROGRAM RECORDED IN RECORDING MEDIUM

(75) Inventor: Hironori Sumitomo, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 798 days.

(21) Appl. No.: 10/395,410

(22) Filed: Mar. 24, 2003

(65) Prior Publication Data
US 2003/0185419 A1 Oct. 2, 2003

(30) Foreign Application Priority Data
Mar. 27, 2002 (JP) .............................. 2002-087417

(51) Int. Cl.
*G06K 9/00* (2006.01)
*H04N 7/14* (2006.01)
*H04N 13/02* (2006.01)
*H04N 7/18* (2006.01)

(52) U.S. Cl. ........................ 382/103; 382/115; 382/153; 382/154; 348/14.08; 348/47; 348/135; 348/143; 348/152

(58) Field of Classification Search ......... 382/103–105, 382/115–118, 153–154; 348/14.08–14.1, 348/47–48, 135–139, 143, 152–155, 159
See application file for complete search history.

(56) References Cited

U.S. PATENT DOCUMENTS 5,835,641 A * 11/1998 Sotoda et al. ............... 382/291
6,359,647 B1 * 3/2002 Sengupta et al. ........... 348/154

(Continued)

FOREIGN PATENT DOCUMENTS

JP 06-217316 A 8/1994

(Continued)

OTHER PUBLICATIONS

Kelly, Patrick H., Arun Katkere, Don Y. Kuramura, Saied Moezzi, Shankar Chatterjee, and Ramesh Jain. "An Architecture for Multiple Perspective Interactive Video". ACM Multimedia 95—Electronic Proceedings. Nov. 5-9, 1995. pp. 1-18.*

(Continued)

*Primary Examiner*—Matthew C Bella
*Assistant Examiner*—Manav Seth
(74) *Attorney, Agent, or Firm*—Sidley Austin LLP

(57) ABSTRACT

A monitoring system according to the present invention has a plurality of cameras respectively monitoring a monitor area and having a changeable imaging magnification, monitoring section detecting an object to be monitored in the monitor area, and control section selecting at least one camera capable of obtaining an enlarged image to contribute to identification of the object to be monitored as camera for enlargement from the plural cameras when the object to be monitored is detected and selecting at least one camera other than the camera for enlargement as camera for wide area from the plural monitoring camera. The camera for wide area is set to a first imaging magnification to obtain a wide area image of the monitor area and the camera for enlargement is set to a second imaging magnification larger than the first imaging magnification to obtain an enlarged image of the detected object to be monitored.

16 Claims, 8 Drawing Sheets